UNITED STATES PATENT OFFICE.

OSKAR UNGER, OF LEVERKUSEN, AND PAUL THOMASCHEWSKI, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

4-METACHLOROPHENYLAMINO-1-ANTHRA-N-METHYLPYRIDON.

995,306. Specification of Letters Patent. Patented June 13, 1911.

No Drawing. Original application filed October 21, 1910, Serial No. 588,348. Divided and this application filed March 10, 1911. Serial No. 613,642.

*To all whom it may concern:*

Be it known that we, OSKAR UNGER and PAUL THOMASCHEWSKI, doctors of philosophy, chemists, citizens of the German Empire, residing, respectively, at Leverkusen and Vohwinkel, Germany, have invented new and useful Improvements in 4-Metachlorophenylamino-1-Anthra-n-Methylpyridon, of which the following is a specification.

The present application which is a divisional application from our application Serial No. 588,348 relates to the manufacture and production of a specific new red wool dyestuff which is obtained by treating 4-meta-chlorophenylaminoanthrapyridon with sulfonating agents in such a way that two sulfonic groups are introduced into the molecule.

In order to illustrate the new process more fully the following example is given, the parts being by weight: 1 part of 4-metachlorophenylamino-1-anthra-n-methylpyridon (obtainable from bromoanthra-n-methylpyridon and meta-chloroanilin) is sulfonated with 10 parts of fuming sulfuric acid (10 per cent. $SO_3$) at a temperature of 20–30° C. until a test portion is soluble in water. The mixture is then poured into 60 parts of water. The dye which is the disulfonic acid separates after a short time in the shape of vermilion red crystals which are filtered off, washed with a small quantity of water to remove the adhering acid and converted with the necessary quantity of caustic soda lye into the dark red sodium salt. The dye dissolves in concentrated sulfuric acid with a bluish-red color which on addition of boric acid turns yellowish-red showing a strong orange fluorescence.

The new coloring matter dyes wool from acid baths in bright scarlet shades, which are very fast.

We claim:

The herein-described 4-meta-chlorophenylamino-1-anthra-n-methylpyridon disulfonic acid, which is after being dried and pulverized in the shape of its sodium salt a dark red powder soluble in concentrated sulfuric acid with a bluish-red color which on addition of boric acid turns yellowish-red showing a strong orange fluorescence; dyeing wool from acid baths bright scarlet shades, substantially as described.

In testimony whereof we have hereunto set our hands in the presence of two subscribing witnesses.

OSKAR UNGER. [L. S.]
PAUL THOMASCHEWSKI. [L. S.]

Witnesses:
CHAS. J. WRIGHT,
ALFRED HENKEL.